(12) United States Patent
Luft

(10) Patent No.: US 6,918,550 B2
(45) Date of Patent: Jul. 19, 2005

(54) FUEL-INJECTION VALVE

(75) Inventor: Heinz Luft, Hirschaid (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 10/148,852

(22) PCT Filed: Sep. 27, 2001

(86) PCT No.: PCT/DE01/03713

§ 371 (c)(1),
(2), (4) Date: Oct. 16, 2002

(87) PCT Pub. No.: WO02/29234

PCT Pub. Date: Apr. 11, 2002

(65) Prior Publication Data

US 2004/0124278 A1 Jul. 1, 2004

(30) Foreign Application Priority Data

Oct. 4, 2000 (DE) .......................................... 100 49 034

(51) Int. Cl.⁷ ........................... B05B 1/30; F02M 59/00; F02M 39/00
(52) U.S. Cl. ............................... 239/585.1; 239/585.5; 239/533.2; 239/533.3; 239/533.11
(58) Field of Search .......................... 239/585.1–585.5, 239/533.2, 533.3, 533.12, 533.14, 88–93, 461, 463, 483, 494, 533.11; 251/129.15, 129.21, 127

(56) References Cited

U.S. PATENT DOCUMENTS 4,179,069 A   12/1979   Hans et al.
5,016,819 A   5/1991   Wood
5,076,499 A   12/1991   Cranford
5,642,862 A * 7/1997   Wakeman et al. ........ 239/585.4
5,875,972 A * 3/1999   Ren et al. .................... 239/463
5,931,391 A   8/1999   Tani et al.
6,065,692 A * 5/2000   Brinn, Jr. ................ 239/533.12
6,179,227 B1 * 1/2001   Ren et al. .................... 239/497
6,382,533 B1 * 5/2002   Mueller et al. .......... 239/585.1

FOREIGN PATENT DOCUMENTS

DE   27 25 135    12/1979
DE   197 36 682   2/1999
DE   196 38 201   12/1999
DE   199 27 196   3/2000
DE   199 35 263   2/2001

* cited by examiner

Primary Examiner—Davis Hwu
(74) Attorney, Agent, or Firm—Kenyon & Kenyon

(57) ABSTRACT

A fuel injector, especially for the direct injection of fuel into a combustion chamber of an internal combustion engine has an actuator which is in operative connection with a valve needle, the valve needle having a valve-closure member at its spray-off end, which cooperates to form a sealing seat together with a valve seat surface which is formed on a valve seat element. Valve-closure member reaches through a swirl element which is positioned on a flow-supply side end face of valve seat element, swirl channels being formed in swirl element. The valve seat element has a ring-shaped elevation on the flow-supply side end face facing the swirl element.

8 Claims, 3 Drawing Sheets

FUEL-INJECTION VALVE

FIELD OF THE INVENTION

The present invention relates to a fuel injector.

BACKGROUND INFORMATION

A fuel injector is described in German Published Patent Application No. 197 36 682 for direct injection of fuel into the combustion chamber of a mixture-compressing, internal combustion engine having externally supplied ignition, which has a guide and seating region at the downstream end of the fuel injector formed by three disk-shaped elements. In this connection, a swirl element is embedded between a guide element and a valve seat element. The guide element is used for guiding an axially movable valve needle reaching through it, while a valve closing section of the valve needle acts together with a valve seat surface of the valve seat element. The swirl element has an inner opening region having several swirl channels which are not in communication with the outer circumference of the swirl element. The entire opening region extends completely over the axial thickness of the swirl element.

It is particularly disadvantageous in the fuel injector known from the above-named document that gaps are created, during assembly of the swirl element, between the swirl element and the guide element, as well as between the swirl element and the valve seat element. This alters the metering cross section, whereby the dispersion of the static flow through the fuel injector is increased. This has a negative effect on the operation of the fuel injector because of differences in the metered fuel quantity per injection cycle.

SUMMARY OF THE INVENTION

By comparison, the fuel injector according to the present invention, having the characteristic features of the main claim, has the advantage that the valve seat element has a ring-shaped elevation on its end face on the fuel supply side facing the swirl element, and this elevation is higher than the unevenness of the surfaces of the valve seat element and the swirl element caused by manufacturing processes. Because of this, the gaps between the valve seat element and the swirl element arising from the assembly and subsequent heating during the operation of the fuel injector are reduced to a value fixed by the height of the ring-shaped elevation, which may compensated for by setting the static flow-through using other components, such as a setting device in the system of fuel supply.

Advantageous further developments of the fuel injector specified in the main claim are rendered possible by the measures given in the dependent claims.

In this context, of particular advantage is the design of a ring surface on the ring-shaped elevation, which makes the component part less sensitive to manufacturing tolerances.

It is also of advantage that the swirl element is clamped in between the guide element and the valve seat element during assembly, and therefore temperature changes during the operation of the fuel injector have no effect on the gap width or the quantity of metered fuel.

The fuel channels of the guide element are advantageously arranged in such a way that the fuel may run without hindrance and without disturbing throttle effects into the swirl channels and flow to the sealing seat.

The design of a swirl chamber is also of advantage, whose volume is selected, depending on the requirements, so that throttle effects may be eliminated.

The wedge-shaped areas at the end face of the valve seat element, bordering on the ring-shaped elevation, are easy to manufacture and, depending on the requirements, may be provided with any angles relative to a horizontal plane of reference.

The ring-shaped elevation may also be made in the shape of a ring which is attached to the end face of the valve seat element. The advantage of this embodiment variant is that one may take over the standard valve seat element without change.

DETAILED DESCRIPTION

Figure 1:
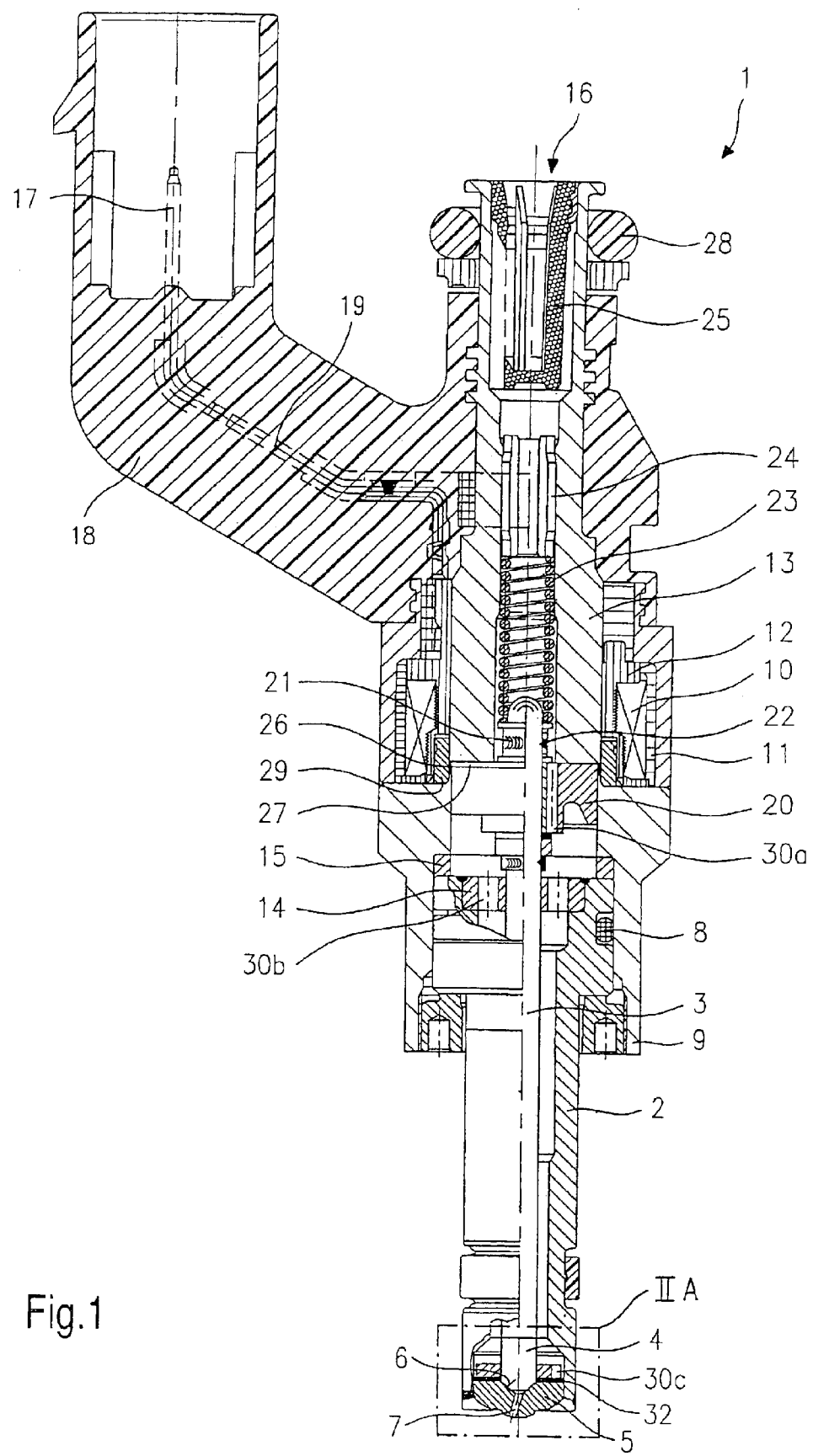
FIG. 1 shows a schematic section through a first exemplary embodiment of a fuel injector according to the present invention.

Before exemplary embodiments of a fuel injector according to the present invention are described more precisely with reference to FIGS. 2A through 2D, to understand the invention better, fuel injector 1 shall first of all be briefly explained in an overall representation with respect to its important components with the aid of FIG. 1.

Fuel injector 1 is designed in the form of an injector for fuel-injection systems of mixture-compressing internal combustion engines having externally supplied ignition. Fuel injector 1 is particularly suitable for directly injecting fuel into a combustion chamber (not illustrated) of an internal combustion engine.

Fuel injector 1 includes a nozzle body 2, in which a valve needle 3 is positioned. Valve needle 3 is connected in operative connection to a valve-closure member 4 that cooperates with a valve-seat surface 6, arranged on a valve-seat member 5, to form a sealing seat. Fuel injector 1 in the exemplary embodiment is an inwardly opening fuel injector 1 which has a spray-discharge opening 7. Nozzle body 2 is sealed from external pole 9 of a magnetic coil 10 by a seal 8. Magnetic coil 10 is encapsulated in a coil housing 11 and wound on a bobbin 12 which lies adjacent to an internal pole 13 of magnetic coil 10. Internal pole 13 and external pole 9 are separated from each other by a gap and are supported on a connecting component 29. Magnetic coil 10 is energized via an electric line 19 by an electric current which can be supplied via an electrical plug-in contact 17. Plug-in contact 17 is enclosed in a plastic jacket 18, which may be sprayed onto internal pole 13.

Valve needle 3 is guided in a valve needle guide 14, which is designed as a disk. A paired adjustment disk 15 is used to adjust the (valve) lift. An armature 20 is on the other side of adjustment disk 15. It is connected by force-locking to valve needle 3 via a first flange 21, and valve needle 3 is connected to first flange 21 by a welded seam 22. Braced against valve needle 21 is a return spring 23 which, in the present design of fuel injector 1, is prestressed by a sleeve 24.

A second flange 31, which is connected to valve needle 3 via a welded seam 33, is used as lower armature stop. An elastic intermediate ring 32, which lies upon second flange 31, avoids bounce when fuel injector 1 is closed.

Fuel channels 30a through 30c run through valve needle guide 14, armature 20 and valve seat member 5, which guide the fuel, supplied via central fuel supply 16 and filtered by a filter element 25, to spray-discharge opening 7. Fuel injector 1 is sealed by seal 28 from a fuel line (not shown).

In the neutral position of fuel injector 1, return spring 23 acts upon armature 20 counter to its lift direction in such a way that valve-closure member 4 is retained in sealing contact against valve seat 6. Upon excitation of magnetic coil 10, the latter generates a magnetic field which moves armature 20 in the lift direction, counter to the spring force of return spring 23, the lift being predefined by a working gap 27 existing in the neutral position between internal pole 12 and armature 20. Armature 20 also carries along in the lift direction flange 21, which is welded to valve needle 3. Valve-closure member 4, being connected to valve needle 3, lifts off from valve seat surface 6, and fuel guided via fuel channels 30a through 30c to spray-discharge opening 7 is sprayed off.

When the coil current is switched off, after sufficient decay of the magnetic field, armature 20 falls away from internal pole 13 because of the pressure of return spring 23, whereupon flange 21, being operatively connected to valve needle 3, moves in a direction counter to the lift direction. Thereby valve needle 3 is moved in the same direction in which valve-closing body 4 sets down upon valve seat surface 6, and fuel injector 1 is closed.

Figure 2A:
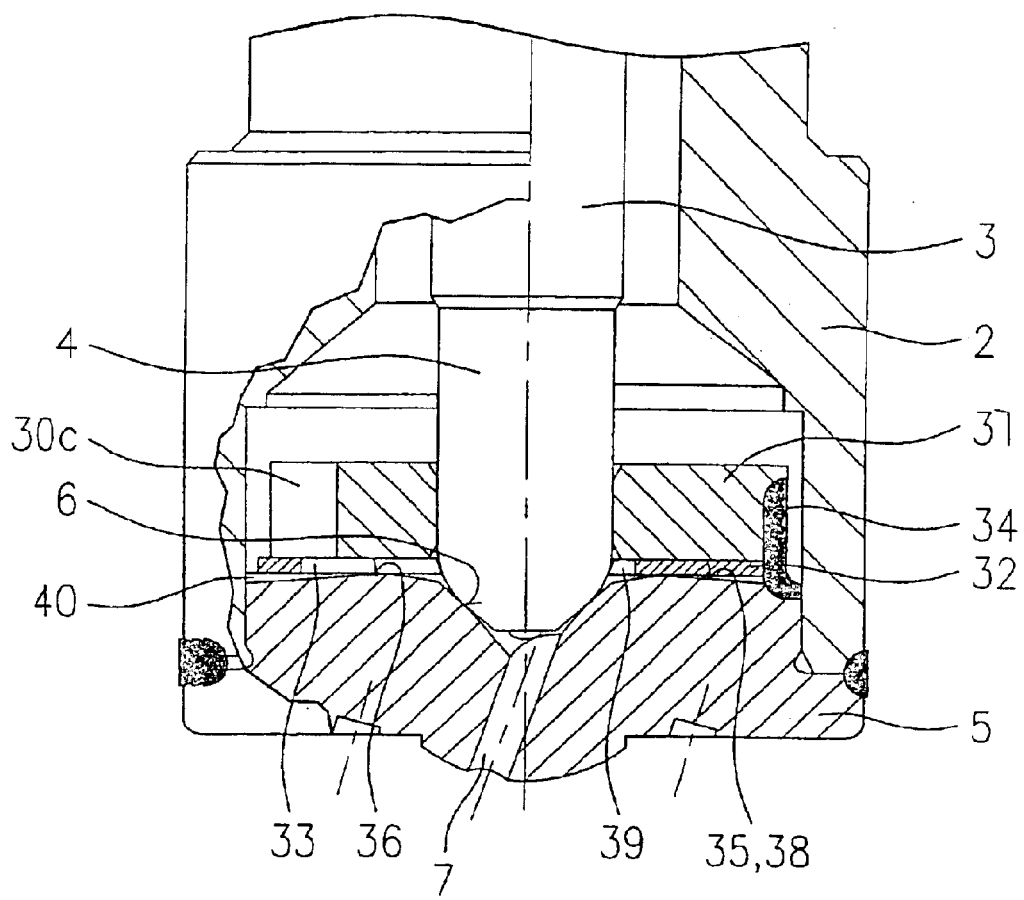
FIG. 2A shows a schematic partial section through a first exemplary embodiment of a fuel injector according to the present invention in region IIA in FIG. 1.

In an extract cross section, FIG. 2A shows the spray-off end of fuel injector 1 according to the present invention shown in FIG. 1. The section shown in FIG. 2A is designated in FIG. 1 as IIA. Here, components identical to those in FIG. 1 are marked with the same reference numerals.

The spray-off end of fuel injector 1 according to the present invention shown in FIG. 2A includes a valve seat element 5 which has a ring-shaped elevation 36 on a fuel-supply side end face 35. An outflow opening 7 is formed in valve seat element 5. Valve seat element 5 forms a sealing seat together with valve seat surface 6 attached to it as well as with valve-closure member 4, which is a part of valve needle 3. In this connection, valve needle 3 reaches through a guide element 31 as well as a swirl element 32. Swirl element 32, in this situation, is positioned between guide element 31 and valve seat element 5. Valve seat element 5 is connected, via a welded seam 34, to swirl element 32 and to guide element 31. The connecting takes place preferably under prestressing, so that swirl element 32 takes up a position, relative to valve seat element 5, which is not changeable any more by later heating during the operation of fuel injector 1 or by the lift movement of valve needle 3.

Guide element 31 has fuel channels 30c which correspond to swirl channels 33 formed in swirl element 32.

Swirl element 32 is preferably formed disk-shaped at constant thickness, and lies on the fuel-supply side of end face 35 of valve seat element 5. Because of ring-shaped elevation 36, unevennesses due to manufacturing technology of swirl element 32 as well as of fuel-supply side end face 35 of valve seat element 5 are reduced to a gap 40 having a defined width. The width of gap 40 between valve seat element 5 and swirl element 32 may here amount to about 7 μm. The diameter of ring-shaped elevation 36 is selected in this case so that it intersects swirl channels 33 of swirl element 32. Elevation 36 may also be formed to be partially ring-shaped, and interrupted in the area of swirl channels 33. The diameter may here be 3.0 mm, for example. Ring-shaped elevation 36 may either be produced as one piece with valve seat element 5 by slanting fuel-supply side end face 35, a wedge-shaped surface 38 being formed, which drops off towards an outer side 37 of valve seat element 5. However, it is also possible to produce ring-shaped elevation 36 by positioning a ring-shaped structure on valve seat element 5. In that case, ring-shaped elevation 36 is connected to valve seat element 5 by soldering or welding.

When fuel injector 1 is operated, valve needle 3 is moved counter to a flow direction of the fuel, whereby valve-closure member 4 lifts off from valve seat surface 6, and fuel is sprayed off through fuel channels 30c, swirl channels 33 and spray-off opening 7.

Figure 2B:
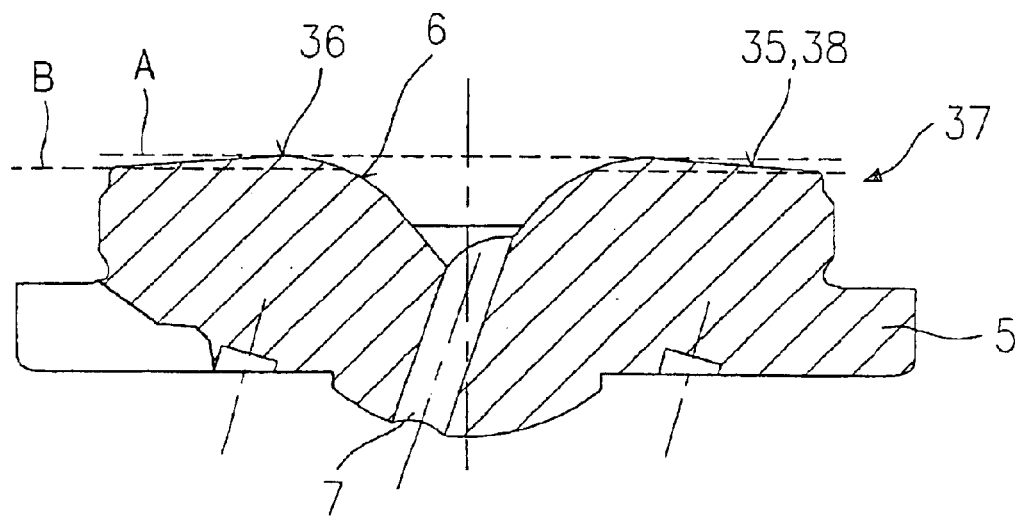
FIG. 2B shows an enlarged view of the valve seat element of the first exemplary embodiment of the fuel injector according to the present invention shown in FIG. 2A.

To make the measure according to the present invention clearer, FIG. 2B shows in an enlargement valve seat element 5 of the first exemplary embodiment shown in FIG. 2A.

To clarify ring-shaped elevation 36, two broken lines A and B are introduced in FIG. 2B. Ring-shaped elevation 36 is here illustrated exaggeratedly high. Wedge-shaped surface 38 becomes lower towards radially outer region 37 of valve seat element 5 by about 7 μm over the diameter of valve seat element 5, which is made clear by the distance between lines A and B in FIG. 2B. The form of valve seat surface 6 as well as downstream structures such as spray-off opening 7 are not changed by the measure according to the present invention.

Figure 2C:
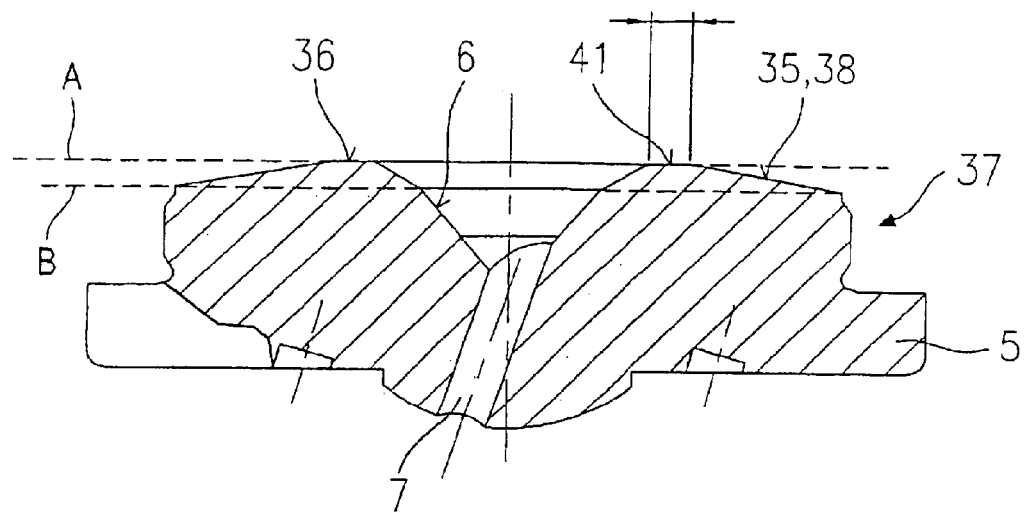
FIG. 2C shows a view of a second exemplary embodiment of the fuel injector according to the present invention in the same region as in FIG. 2B.

In the same view as in FIG. 2B, FIG. 2C shows a further exemplary embodiment of valve seat element 5 of a fuel injector 1 embodied according to the present invention.

In contrast to FIG. 2B, ring-shaped elevation 36, which is developed in FIG. 2B without significant radial extension, that is, edge-shaped because of wedge-shaped surface 38 bordering on inclined valve seat surface 6, is designed in the present second exemplary embodiment as ring-shaped elevation 36 having a ring surface 41, which lies against swirl element 32 in a planar manner. The radial expansion of ring surface 41 may in this instance be 0.2 to 0.4 mm, for example. The advantage of a planar stamping of ring-shaped elevation 36 is that it makes for an improved seating against the swirl element, so that manufacturing tolerances do not lead to an increase in dispersion of the static flow-through, as would be possible, under certain circumstances, in the case of a sort of linear contact surface as in the first exemplary embodiment, since even in the case of small unevennesses, new gaps are created between ring-shaped elevation 36 of valve seat element 6 and swirl element 32.

Figure 2D:
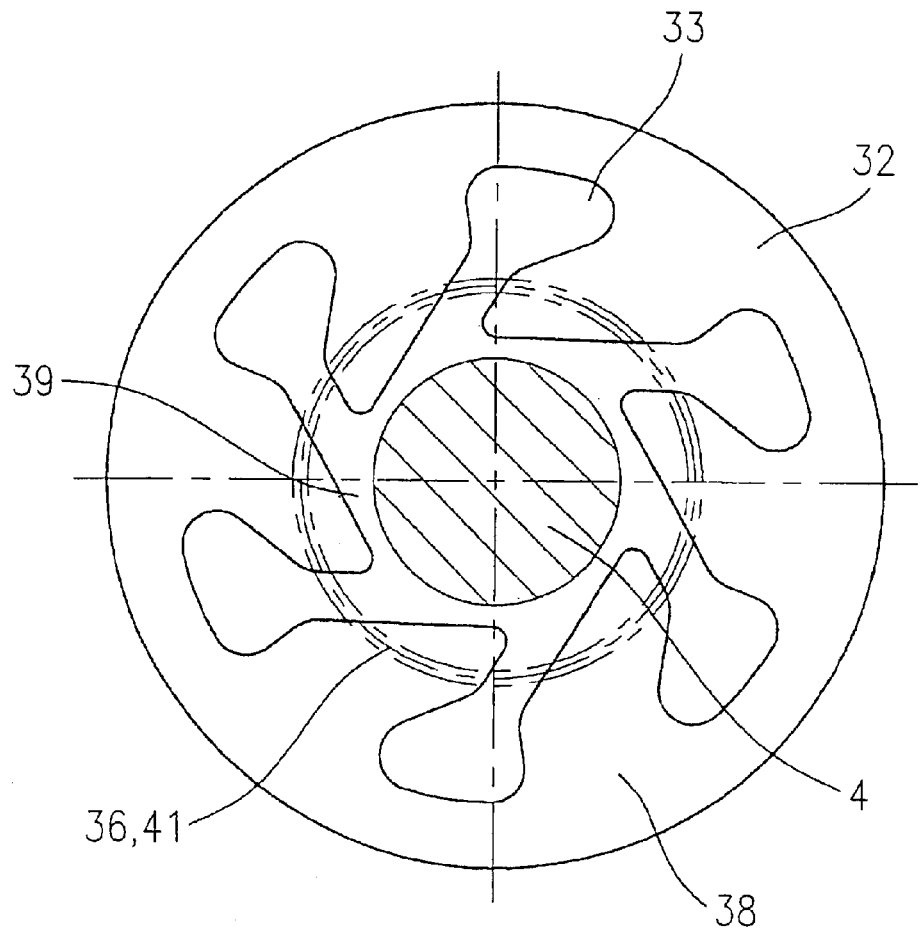
FIG. 2D shows a schematic view of the swirl element of a fuel injector according to the present invention from opposite to the flow direction of the fuel.

FIG. 2D shows a top view of swirl element 32 having swirl channels 33, which is penetrated by valve-closure member 4. Ring-shaped elevation 36 of valve seat element 5 is here projected on swirl element 32. In this context, the outermost and the innermost circular line indicate the radial extension of ring-shaped elevation 36, shown in FIG. 2C by ring surface 41.

Between swirl channels 33 and valve-closure member 4 a swirl chamber 39 is formed. In this connection, the volume of swirl chamber 39 may be selected, according to the requirements on fuel injector 1 in such a way that either intended throttle effects appear because of a small diameter, or the throttle effects are completely eliminated by a greater volume of swirl chamber 39. The volume of swirl chamber 39, has to be dimensioned in any case so that the swirl flow generated by swirl channels 33 in swirl element 32 remains homogeneous and is not brought to a standstill even during the idle time between two injection cycles of fuel injector 1, since the injection properties would otherwise be influenced negatively.

According to the present invention, in the embodiment described above of valve seat element 5 of fuel injector 1, it may be achieved that gap 40 caused by unevennesses due to the manufacturing process, present between swirl element 32 and valve seat element 5, may be eliminated to the extent that a constant width of gap 40 is attained, and the increase in flow-through conditioned on this is compensated for by a suitable setting of the static flow-through in the system of fuel supply. As a result, overall only a very slight dispersion of the static flow-through still appears.

The present invention is not limited to the illustrated exemplary embodiment, and may also be used, for example, for equipment having other swirl elements 32 having more or fewer swirl channels 33 as for any embodiments of fuel injectors 1 having any actuators 10.

What is claimed is:

1. A fuel injector for a direct injection of a fuel into a combustion chamber of an internal combustion engine having a longitudinal axis, comprising:
   a valve seat element on which is formed a valve seat surface;
   a valve needle including a valve-closure member arranged at a spray-off end thereof, the valve closure member cooperating with the valve seat surface to form a sealing seat;
   an actuator that is in operative connection with the valve needle; and
   a swirl element positioned at a flow-supply side end face of the valve seat element and through which the valve-closure member reaches, the swirl element including swirl channels, wherein the valve seat element includes one of a ring-shaped elevation and a partially ring-shaped elevation having a tapered portion tilting upwardly toward the longitudinal axis of the fuel injector on the flow-supply side end face facing the swirl element.

2. The fuel injector as recited in claim 1, wherein the one of the ring-shaped element and the partially ring-shaped element is one of formed as one piece with the valve seat element and connected to the valve seat element.

3. The fuel injector as recited in claim 2, wherein the one of the ring-shaped element and the partially ring-shaped element is connected to the flow-supply side end face by one of welding and soldering.

4. The method as recited in claim 1, wherein the one of the ring-shaped element and the partially ring-shaped element includes a ring surface which lies against the swirl element in a planar manner.

5. The fuel injector as recited in claim 1, further comprising:
   a guide element;
   wherein the swirl element is positioned between the guide element and the valve seat element.

6. The fuel injector as recited in claim 5, wherein the guide element includes fuel channels that correspond to the swirl channels of the swirl element.

7. The fuel injector as recited in claim 5, wherein the guide element and the swirl element are connected to the valve seat element by a welded seam.

8. The fuel injector as recited in claim 1, wherein between the swirl element and the valve-closure member a swirl chamber is formed.

* * * * *